(12) United States Patent
Koma

(10) Patent No.: US 7,847,883 B2
(45) Date of Patent: Dec. 7, 2010

(54) REFLECTIVE LIQUID CRYSTAL DISPLAY DEVICE

(75) Inventor: Norio Koma, Kitagata-Cho (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 232 days.

(21) Appl. No.: 11/436,638

(22) Filed: May 19, 2006

(65) Prior Publication Data
US 2006/0261337 A1  Nov. 23, 2006

(30) Foreign Application Priority Data

| May 20, 2005 | (JP) | ............................. 2005-148541 |
| May 20, 2005 | (JP) | ............................. 2005-148545 |
| Jul. 7, 2005 | (JP) | ............................. 2005-199434 |
| Jul. 22, 2005 | (JP) | ............................. 2005-213453 |

(51) Int. Cl.
*G02F 1/1335* (2006.01)
(52) U.S. Cl. .......................................... 349/69; 349/63
(58) Field of Classification Search ................... 349/63, 349/69
See application file for complete search history.

(56) References Cited

U.S. PATENT DOCUMENTS

| 5,275,680 | A | * | 1/1994 | Sirkin et al. ................ 156/277 |
| 5,796,509 | A | | 8/1998 | Doany et al. |
| 6,025,894 | A | | 2/2000 | Shirasaki et al. |
| 6,181,394 | B1 | * | 1/2001 | Sanelle et al. ................ 349/96 |
| 6,208,391 | B1 | | 3/2001 | Fukushima et al. |
| 6,441,873 | B2 | | 8/2002 | Young |
| 6,507,378 | B1 | | 1/2003 | Yano et al. |
| 6,528,824 | B2 | | 3/2003 | Yamagata et al. |
| 6,542,207 | B1 | * | 4/2003 | Yoshizawa .................. 349/69 |
| 6,556,260 | B1 | * | 4/2003 | Itou et al. ..................... 349/69 |
| 6,644,832 | B2 | | 11/2003 | Yoshida et al. |

(Continued)

FOREIGN PATENT DOCUMENTS

CN   1577001   2/2005

(Continued)

OTHER PUBLICATIONS

European Search Report mailed on Feb. 27, 2006 for European Application No. 05026116.3 filed on Nov. 29, 2005, 10 pages.

(Continued)

*Primary Examiner*—Michael H Caley
(74) *Attorney, Agent, or Firm*—Morrison & Foerster LLP

(57) ABSTRACT

The invention is directed to the higher contrast in a liquid crystal display device (LCD) having a lighting portion as a front light. A lighting portion is formed by interposing an organic EL layer between a transparent substrate and a transparent substrate. A light shield layer is formed covering a cathode layer of the organic EL element layer. The lighting portion is disposed above the reflective LCD. The reflective LCD has a polarizing plate, a light scattering layer, an opposing substrate, a common electrode, a liquid crystal layer, and a TFT substrate. When the refractive indexes of seven layers of an anode layer, the transparent substrate, a resin layer, the polarizing plate, the light scattering layer, the opposing substrate, and the common electrode are defined as n(1), n(2), n(3), n(4), n(5), n(6), and n(7) respectively, the relation of $1.33 > n(k)/n(k+1) > 0.75 (k=1-6)$ holds.

11 Claims, 10 Drawing Sheets

U.S. PATENT DOCUMENTS

| | | |
|---|---|---|
| 6,661,488 B1 | 12/2003 | Takeda et al. |
| 6,671,014 B2 | 12/2003 | Yokoyama et al. |
| 6,723,392 B1 * | 4/2004 | Jinnai et al. ............... 428/1.1 |
| 6,724,452 B1 | 4/2004 | Takeda et al. |
| 6,866,393 B2 * | 3/2005 | Yano et al. ............... 362/600 |
| 7,034,911 B2 | 4/2006 | Kato |
| 7,167,224 B1 | 1/2007 | Takeda et al. |
| 7,224,421 B1 | 5/2007 | Takeda et al. |
| 7,227,606 B2 | 6/2007 | Takeda et al. |
| 7,245,343 B2 * | 7/2007 | Suzuki et al. ............. 349/153 |
| 7,248,331 B2 | 7/2007 | Miyatake et al. |
| 7,304,703 B1 | 12/2007 | Takeda et al. |
| 7,359,011 B2 | 4/2008 | Hamada et al. |
| 2001/0035924 A1 | 11/2001 | Fujieda |
| 2002/0122144 A1 | 9/2002 | Yoshida et al. |
| 2003/0156239 A1 | 8/2003 | Inoue et al. |
| 2003/0209707 A1 | 11/2003 | Tsuchiya |
| 2003/0214227 A1 * | 11/2003 | Tsuchiya ................. 313/504 |
| 2004/0109106 A1 | 6/2004 | Yang et al. |
| 2004/0125449 A1 | 7/2004 | Sales |
| 2004/0141103 A1 | 7/2004 | Kotchick et al. |
| 2004/0141106 A1 | 7/2004 | Wu et al. |
| 2004/0179154 A1 * | 9/2004 | Hong ..................... 349/113 |
| 2004/0206960 A1 | 10/2004 | Nishikawa |
| 2005/0001545 A1 | 1/2005 | Aitken et al. |
| 2005/0056840 A1 | 3/2005 | Yamazaki et al. |
| 2005/0088594 A1 | 4/2005 | Mitsui et al. |
| 2006/0132671 A1 | 6/2006 | Koma |
| 2006/0262242 A1 | 11/2006 | Koma |
| 2006/0279673 A1 | 12/2006 | Tanase et al. |
| 2007/0064187 A1 | 3/2007 | Takeda et al. |
| 2008/0074591 A1 | 3/2008 | Hamada et al. |
| 2008/0165314 A1 | 7/2008 | Takeda et al. |
| 2008/0303983 A1 | 12/2008 | Tanase et al. |
| 2008/0303997 A1 | 12/2008 | Takeda et al. |
| 2008/0309850 A1 | 12/2008 | Tanase et al. |
| 2009/0207360 A1 | 8/2009 | Takeda et al. |

FOREIGN PATENT DOCUMENTS

| | | |
|---|---|---|
| JP | 05-325586 | 12/1993 |
| JP | 7-311383 | 11/1995 |
| JP | 10-213799 | 8/1998 |
| JP | 11-174427 | 7/1999 |
| JP | 11-242225 | 9/1999 |
| JP | 11-326903 | 11/1999 |
| JP | 2002-198167 | 7/2002 |
| JP | 2002-216961 A | 8/2002 |
| JP | 2003-57643 | 2/2003 |
| JP | 2003-255375 | 9/2003 |
| JP | 2003-317947 | 11/2003 |
| JP | 2004-145067 | 5/2004 |
| JP | 2004-302135 | 10/2004 |
| JP | 2005-128084 | 5/2005 |
| WO | WO-2004/023173 | 3/2004 |

OTHER PUBLICATIONS

European Search Report mailed on Sep. 18, 2006 for European Application No. 06010532.7 filed on May 22, 2006, 8 pages.

Tanase et al., U.S. Office Action mailed on Nov. 14, 2007 directed towards related U.S. Appl. No. 11/436,883; 8 pages.

Koma et al., U.S. Office Action mailed on Nov. 13, 2008 directed towards related U.S. Appl. No. 11/288,411; 21 pages.

Koma et al., U.S. Office Action mailed on Mar. 24, 2009 directed towards related U.S. Appl. No. 11/436,712; 17 pages.

European Office Action mailed on Aug. 20, 2008 for European Application No. 06010532.7; (8 pages).

European Office Action mailed on Apr. 22, 2008 for European Application No. 06010532.7; (8 pages).

Tanase et al., U.S. Office Action mailed May 28, 2009, directed towards U.S. Patent Application No. 12/198,529; (5 pages).

* cited by examiner $L1 \geqq L2$

REFLECTIVE LIQUID CRYSTAL DISPLAY DEVICE

CROSS-REFERENCE OF THE INVENTION

This invention is based on Japanese Patent Applications Nos. 2005-148541, 2005-148545, 2005-199434 and 2005-213453, the contents of which are incorporated herein by reference in its entirety.

BACKGROUND OF THE INVENTION

1. Field of the Invention

The invention relates to a display device having a lighting portion.

2. Description of the Related Art

A liquid crystal display device (hereafter, referred to as a LCD) is thin and consumes low power in its characteristics, and has been broadly used as a monitor of a computer or a monitor of a mobile data terminal such as a cellular phone. There are a transmissive LCD, a reflective LCD, and a semi-transmissive LCD as the LCD. In the transmissive LCD, a transparent electrode is used as a pixel electrode for applying a voltage to a liquid crystal and a back light is set in the rear of the LCD, so that a bright display can be realized by controlling a transmission amount of light of this back light even in the dark. However, in an environment where external light is strong such as out of doors in the daytime, contrast can not be obtained enough.

The reflective LCD uses external light such as sunlight or interior light as a light source, and reflects the external light entering the LCD by a reflective pixel electrode formed of a reflective layer formed on a substrate on a viewer side. The reflective LCD makes a display by controlling an amount of light released from a LCD panel in each of the pixels after the light enters a liquid crystal and is reflected by the reflective pixel electrode. Since this reflective LCD uses external light as a light source, there is a problem that the display can not be made in an environment of no external light.

The semi-transmissive LCD has both the transmissive function and the reflective function, and is applicable to both the bright and dark environments. However, since this semi-transmissive LCD has a transmissive region and a reflective region in a pixel, there is a problem of low display efficiency in each of the pixels.

For solving this, it has been suggested that a front light is provided in the reflective LCD to realize a display even in the dark environment. FIG. 14 is a view showing the reflective LCD with the front light. A transparent acrylic plate 110 is disposed, being opposed to a display surface of a reflective LCD 100. A plurality of grooves 111 shaped in inverted triangles is formed on a surface of this transparent acrylic plate 110, which is on the opposite side to the side opposed to the reflective LCD 100. Furthermore, a light source 112 is disposed on a side surface of the transparent acrylic plate 110. Light entering the transparent acrylic plate 110 from the light source 112 is refracted in a direction to the reflective LCD 100 by inclined surfaces of the grooves 111 shaped in inverted triangles, and enters the display surface of the reflective LCD 100.

The relating technology is described in the Japanese Patent Application Publication Nos. 5-325586 and 2003-255375.

However, the light entering the transparent acrylic plate 110 from the light source 112 is refracted in a direction to a viewer 113 on the opposite side to the reflective LCD 100 by a small amount as well as in the direction to the reflective LCD 100 by the inclined surfaces of the grooves 111 provided in the transparent acrylic plate 110. Therefore, the small amount of light leaks from the transparent acrylic plate 110 to reach the eyes of the viewer 113, causing a problem of degrading the contrast of a LCD display.

SUMMARY OF THE INVENTION

A display device of the invention includes a lighting portion disposed on a liquid crystal display portion, the lighting portion including a light emitting thin body formed on a first substrate and the liquid crystal display portion including a plurality of pixels, a second substrate formed with a reflective pixel electrode receiving light emitted by the light emitting thin body in each of the pixels, a third substrate disposed on and opposed to the second substrate and formed with a common electrode on its front surface, and a liquid crystal layer sealed between the second substrate and the third substrate. When the refractive indexes of two adjacent layers between the light emitting thin body and the liquid crystal layer are defined as n1 and n2 respectively, the relation of $1.33 > n1/n2 > 0.75$ holds.

The display device of the invention can provide a LCD display with enhanced contrast in both the bright and dark environments.

DETAILED DESCRIPTION OF THE INVENTION

Figure 1:
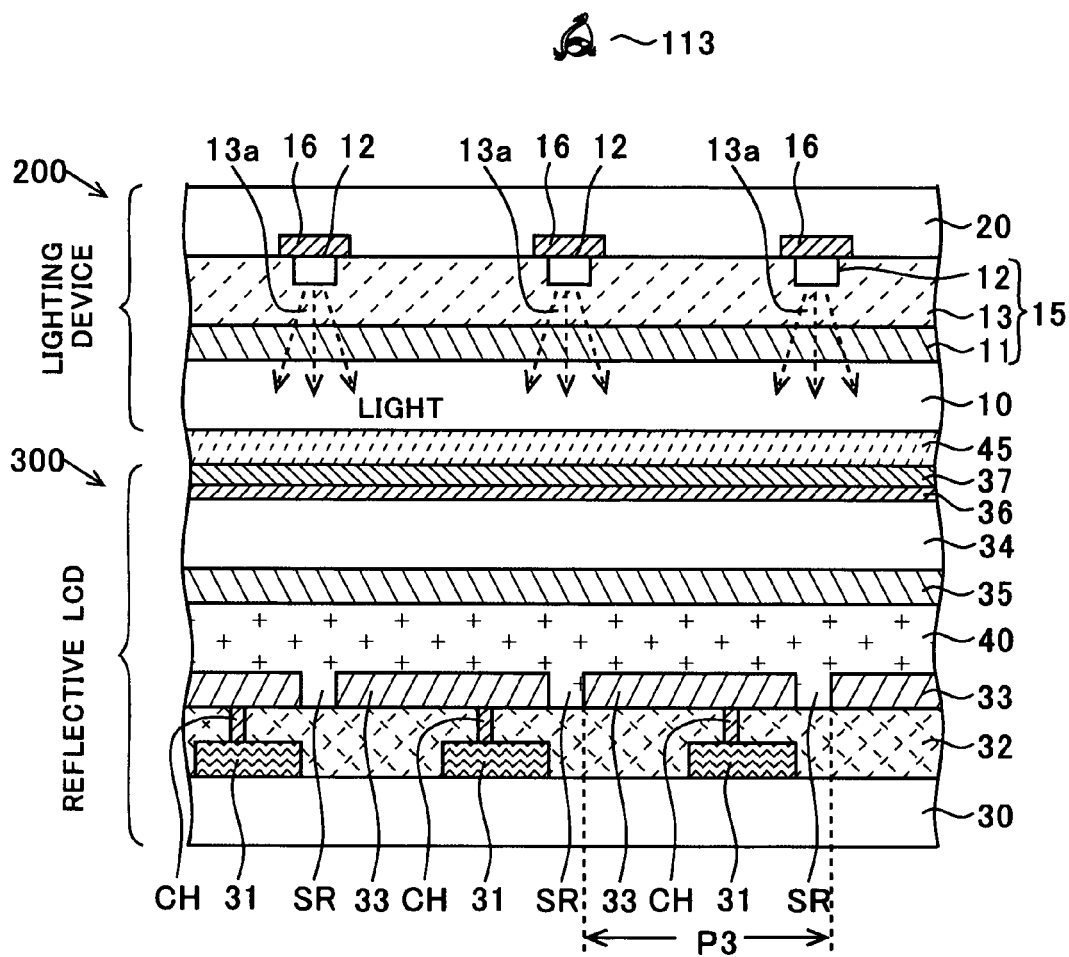
FIG. 1 is a cross-sectional view of a display device of a first embodiment of the invention.
Figure 2:
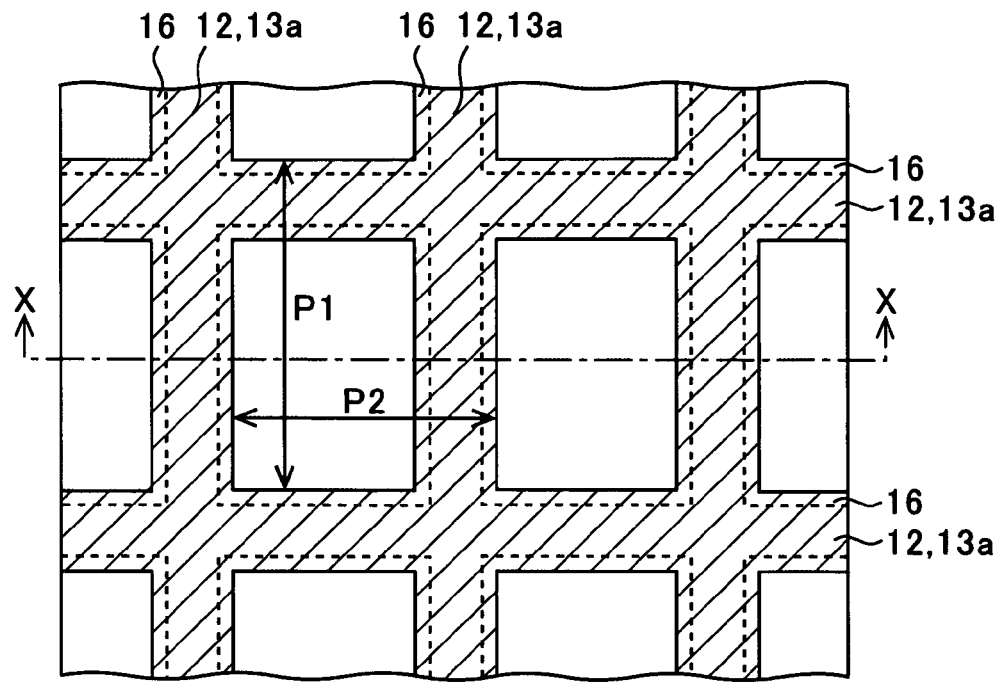
FIG. 2 is a plan view of a reflective LCD provided with the display device of the first embodiment of the invention on a lighting portion side.

A display device of a first embodiment of the invention will be described referring to figures. FIG. 2 is a plan view of a reflective LCD 300 provided with a lighting portion 200 of this embodiment on the lighting portion 200 side, and FIG. 1 is a cross-sectional view of FIG. 2 along line X-X. In this embodiment, the lighting portion 200 is disposed above the reflective LCD 300, being opposed to a display surface of the LCD 300 as shown in FIG. 1.

The structure of the lighting portion 200 will be described first. An organic electroluminescent element layer 15 (hereafter, abbreviated to an "organic EL element layer 15") is interposed between a transparent substrate 10 and a transparent substrate 20 made of a glass substrate or the like. The organic EL element layer 15 includes an anode layer 11 made of a transparent conductive material such as ITO (Indium Tin Oxide) or IZO (Indium Zinc Oxide) and formed on substantially the whole surface of the transparent substrate 10, an organic layer 13 formed on this anode layer 11, and a cathode layer 12 formed on the organic layer 13 and patterned into a grid with a predetermined pitch.

The organic layer 13 includes a so-called electron transport layer, an emissive layer, and a hole transport layer. The cathode layer 12 includes, for example, an aluminum layer (Al layer), a layered body of a magnesium layer (Mg layer) and a silver layer (Ag layer), or a calcium layer (Ca layer). It is preferable that the anode layer 11 is about 100 nm, the cathode layer 12 is about 500 nm, and the organic layer 13 is about 100 nm in thickness. An inorganic EL element layer can be used instead of the organic EL element layer 15.

In this organic EL element layer 15, a region of the organic layer 13 interposed between the anode layer 11 and the cathode layer 12 is an emissive region 13a. That is, a region of the organic layer 13 immediately under the cathode layer 12 is the emissive region 13a. In a plan view of this emissive region 13a, this emissive region 13a has the same grid shape as that of the cathode layer 12. This emissive region 13a emits light by applying a positive potential to the anode layer 11 and a negative potential to the cathode layer 12.

The other region of the organic layer 13 does not emit light as a non-emissive region. Furthermore, a light shield layer 16 is formed covering the cathode layer 12 patterned into a grid. The light shield layer 16 is also patterned into the same grid shape as that of the cathode layer 12. The light shield layer 16 is provided for shielding light emitted upward from the emissive region 13a, and thus need have a function as a light reflection layer for reflecting light or a light absorption layer for absorbing light. The light shield layer 16 is preferably 10 nm or less in thickness.

The light reflection layer is made of, for example, chromium (Cr), aluminum oxide ($Al_2O_3$) or the like. The light absorption layer is made of a black pigment layer made of a photoresist material containing a black pigment, a black dye layer made of a photoresist material containing black dye, a chromium oxide layer, or the like.

Light emitted downward from the emissive region 13a enters the reflective LCD 300 through the transparent anode layer 11 and the transparent substrate 10. Light emitted upward from the emissive region 13a is reflected downward or absorbed by the cathode layer 12 and the light shield layer 16. Therefore, light from the emissive region 13a is prevented substantially from directly entering the eyes of the viewer 113 watching the lighting portion 200 from thereabove.

Although the cathode layer 12 is patterned into a grid with a predetermined pitch and the anode layer 11 is not patterned in the described structure, it is possible to change positions of the cathode layer 12 and the anode layer 11. That is, it is possible to place the anode layer 11 in the position of the cathode layer 12 and the cathode layer 12 in the position of the anode layer 11 in FIG. 1. In this case, the anode layer 11 is patterned into the predetermined shape and the cathode layer 12 is not patterned.

Alternatively, the anode layer 11 and the cathode layer 12 can be formed on the whole surface without being patterned at all and at least one of the three layers of the electron transport layer, the emissive layer, and the hole transport layer forming the organic layer 13 can be patterned in the predetermined shape. In this case, a region where all the three layers are formed is the emissive region, and a region where any one of the three layers is missing is the non-emissive region.

Figure 3:
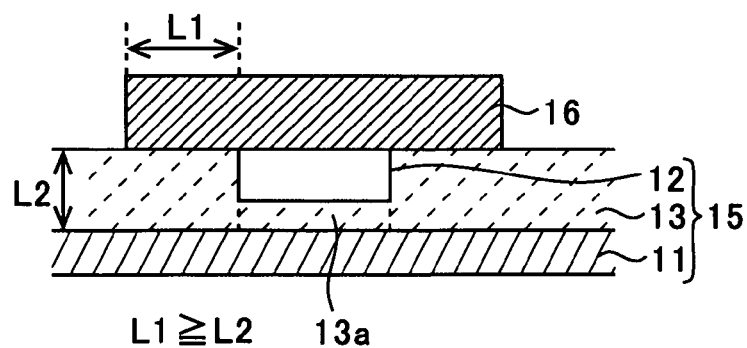
FIG. 3 is an enlarged partial cross-sectional view of the lighting portion of the display device of the first embodiment of the invention.

It is preferable that the width of the light shield layer 16 is larger than the width of the patterned cathode layer 12 (or the anode layer) for enhancing a light shield effect. Furthermore, it is preferable that a length L1 between the edge of the patterned cathode layer 12 (or the anode layer) and the edge of the light shield layer 16 is equal to or larger than the total thickness L2 of the emissive region 13a of the organic layer 13 and the patterned cathode layer 12 (or the anode) for further enhancing the light shield effect, as shown in FIG. 3.

Furthermore, it is preferable that the pitch (lengths P1 and P2 in FIG. 2) of the grid of the patterned cathode layer 12 (or the anode layer 11) is 1 mm or less for preventing the viewer 113 from sensing a discomfort.

Next, the structure of the reflective LCD 300 to be lighted by the described lighting portion 200 and the connection of the LCD 300 with the lighting portion 200 will be described. A switching thin film transistor 31 (hereafter, referred to as TFT) is formed on the TFT substrate 30 made of a glass substrate in each of the pixels. The TFT 31 is covered with an interlayer insulation film 32, and a pixel electrode 33 made of a reflective material such as aluminum (Al) is formed on the interlayer insulation film 32, corresponding to each of the TFTs 31. The pixel electrode 33 is connected to a drain or a source of the corresponding TFT 31 through a contact hole CH formed in the interlayer insulation film 32.

An opposing substrate 34 made of a glass substrate is disposed, being opposed to the TFT substrate 30 formed with the pixel electrode 33. A common electrode 35 made of ITO is formed on the front surface of the opposing substrate 34. A light scattering layer 36 made of a diffusion adhesion layer and a polarizing plate 37 are layered on the back surface of the opposing substrate 34 in this order. The light scattering layer 36 scatters light emitted from the lighting portion 200 to equally irradiate the pixel electrode 33 with the light. A liquid crystal layer 40 is sealed between this opposing substrate 34 and the TFT substrate 30.

With the described structure, light emitted from the lighting portion 200 is polarized in a predetermined direction by the polarizing plate 37, passes through the light scattering layer 36, the opposing substrate 34, and the common electrode 35, enters the liquid crystal layer 40, and is reflected by the pixel electrode 33. The light reflected by the pixel electrode 33 returns through the same route, and is visually recognized by the viewer 113 through spaces between the light shield layer 16 patterned into a grid. At this time, depending on an electric field applied between the pixel electrode 33 and the common electrode 35, light transmittance changes in each of the pixels. This can realize a LCD display since the intensity of light reflected by the pixel electrode 33 changes in each of the pixels. As described above, since the light shield layer 16 is provided in the lighting portion 200, leakage of light emitted by the emissive region 13a can be minimized and thus the contrast of a LCD display can be enhanced.

It is preferable that the lighting portion 200 is disposed above the reflective LCD 300 adjacently. If an air layer exists between the lighting portion 200 and the reflective LCD 300, light emitted from the transparent substrate 10 of the lighting portion 200 is reflected by an interface between the transparent substrate 10 and the air layer when entering the air layer and returns to the viewer side, thereby degrading the contrast of a LCD display. Therefore, it is preferable that the lighting portion 200 and reflective LCD 300 are attached with a resin layer 45 (e.g. a UV curable resin layer or a visible light curable resin layer) having the same refractive index as that of the transparent substrate 10 therebetween in order to minimize light refraction.

Figure 4:
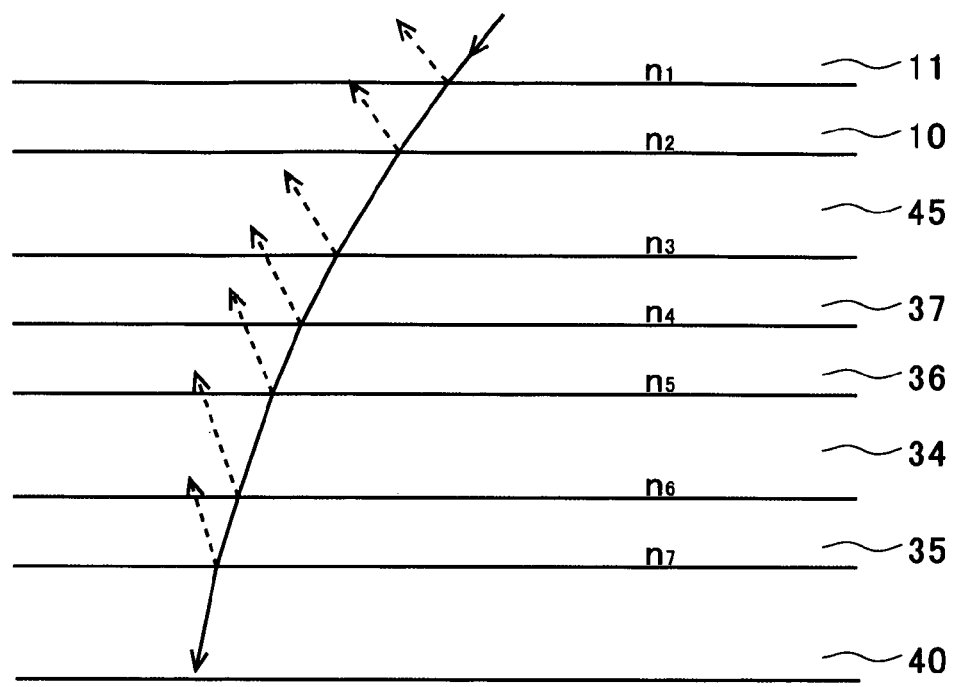
FIG. 4 is a cross-sectional view of the display device of the first embodiment of the invention.

Next, descriptions will be given on the structure for preventing reflection of light emitted by the lighting portion 200 and incident light from outside through the transparent substrate 20 for further enhancing the contrast of a LCD display. As described above, external light or light from the lighting portion 200 passes through the anode layer 11, the transparent substrate 10, the resin layer 45, the polarizing plate 37, the light scattering layer 36, the opposing substrate 34, and the common electrode 35 to enter the liquid crystal layer 40. Such light is reflected by interfaces between two adjacent layers (e.g. the interface between the anode layer 11 and the transparent substrate 10, the interface between the transparent substrate 10 and the resin layer 45, and so on) as shown in FIG. 4.

Figure 5:
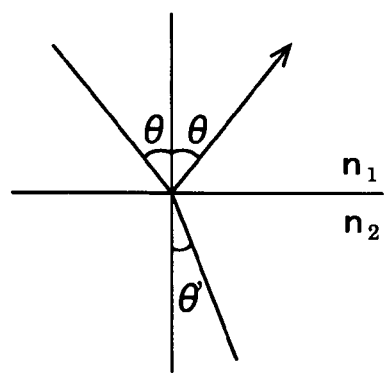
FIG. 5 is a cross-sectional view for explaining light reflection by an interface between two adjacent layers.

Generally, the more the difference in refractive index between two layers is, the more the reflectance of light at the interface between the two layers is. The refractive indexes of two layers are defined as n1 and n2, respectively. Descriptions will be given on a case where light enters from the layer of refractive index n1 to the layer of refractive index n2 and is reflected by the interface of these layers as shown in FIG. 5.

In this case, the reflectance at the interface between the two layers is expressed by the following formulae 1 and 2.

$$R_P = \left(\frac{n_2 \cos\theta - n_1 \cos\theta'}{n_2 \cos\theta + n_1 \cos\theta'}\right) \quad \text{[Formula 1]}$$

$$R_S = \left(\frac{n_1 \cos\theta - n_2 \cos\theta'}{n_1 \cos\theta + n_2 \cos\theta'}\right) \quad \text{[Formula 2]}$$

In these formulae, $R_P$ is the reflectance of a polarized light component (P wave) that is polarized in the plane of incidence, and $R_S$ is the reflectance of a polarized light component (S wave) that is polarized perpendicularly to the plane of incidence. $\theta$ is an incident angle of incident light, and $\theta'$ is the refraction angle of the incident light. Since $\theta = \theta' = 0$ for incident light from the front, that is, incident light perpendicular to the interface between two layers, it follows that $R_P = R_S = R$. The following formula 3 is obtained by solving the formula 1 for R.

$$R = \left(\frac{n_1 - n_2}{n_1 + n_2}\right)^2 \quad \text{[Formula 3]}$$

The n1 and n2 have the relation expressed by the formula 4 or the formula 5 by modifying this formula 3.

$$\frac{n_1}{n_2} = \frac{1 + \sqrt{R}}{1 - \sqrt{R}} \quad \text{[Formula 4]}$$

$$\frac{n_1}{n_2} = \frac{1 - \sqrt{R}}{1 + \sqrt{R}} \quad \text{[Formula 5]}$$

When the light reflectance at the interface between the two layers is large, the reflected light is visually recognized by a viewer, thereby degrading the contrast of a LCD display. Therefore, it is necessary to set the reflectance R at the interface between the two adjacent layers for the incident light from the front to 2% or less in the display device of the embodiment, taking the prevention of the degradation of the contrast into account. The refractive index that satisfies this condition can be expressed by the formula 6 from the formula 4 and the formula 5.

$$1.33 > \frac{n_1}{n_2} > 0.75 \quad \text{[Formula 6]}$$

That is, it is necessary to set the relation of the refractive indexes of the two adjacent layers as the formula 6 in order to prevent the degradation of the contrast of a LCD display. It is more preferable to set the reflectance R of the incident light from the front to 1% or less in order to further prevent the degradation of the contrast of a LCD display. The relation of the refractive indexes that satisfies this condition can be expressed by the following formula 7.

$$1.22 > \frac{n_1}{n_2} > 0.82 \quad \text{[Formula 7]}$$

In this embodiment, when the refractive indexes of the seven layers, i.e., the anode layer 11, the transparent substrate 10, the resin layer 45, the polarizing plate 37, the light scattering layer 36, the opposing substrate 34, and the common electrode 35 are defined as n(1), n(2), n(3), n(4), n(5), n(6), and n(7) respectively, the relation of the following formula 8 need be satisfied in order to set the reflectance of each of the interfaces between these layers to 2% or less. Furthermore, the relation of the following formula 9 need be satisfied in order to set the reflectance of each of the interfaces between the layers to 1% or less. It is noted that k=1-6 in the formulae 8 and 9.

$$1.33 > \frac{n_{(K)}}{n_{(K+1)}} > 0.75 \quad \text{[Formula 8]}$$

$$1.22 > \frac{n_{(K)}}{n_{(K+1)}} > 0.82 \quad \text{[Formula 9]}$$

When there is an omitted layer in these seven layers, the above relation is to be satisfied between the remaining layers. For example, when the transparent substrate 10, the resin layer 45, and the light scattering layer 36 are omitted, the relation of the above formula 8 or formula 9 is to be satisfied between the remaining four layers, that is, the anode layer 11, the polarizing plate 37, the opposing substrate 34, and the common electrode 35.

Next, the positional relationship between the lighting portion 200 and the pixels of the reflective LCD 300 will be described. In the reflective LCD 300, a plurality of pixels each having the same size is arrayed at the same pitch in row and column directions. FIG. 1 shows a pitch P3 of the pixels in the row direction (a pitch of the pixel electrodes 33).

Each of the pixels has a TFT 31 and a pixel electrode 33. The pitch of the grid of the cathode layer 12 and the light shield layer 16 of the lighting portion 200 is equal to the pitch of the pixels. That is, a pitch P2 of the grid in the row direction is equal to the pitch P3 of the pixels in the row direction, and a pitch P1 of the grid in the column direction is equal to the pitch of the pixels in the column direction. In this case, it is preferable to dispose the cathode layer 12 and the light shield layer 16 of the lighting portion 200 right above a separating region SR of the pixel electrodes 33, which does not contribute to a LCD display. This provides an advantage that most light reflected by the reflective electrodes 33 is visually recognized by the viewer 113 through spaces of the grid without being shielded by the light shield layer 16.

Alternatively, the pitch of the grid of the cathode layer 12 and the light shield layer 16 of the lighting portion 200 (the pitch in the row and column directions) can be smaller than the pitch of the pixels (the pitch in the row and column directions) and a ratio of the pitch of the grid to the pitch of the pixels (the pitch of the grid/the pitch of the pixels) can be 1/natural number. Although interference fringes or moiré fringes can occur in the LCD display if the pitch of the grid and the pitch of the pixels are equal, this setting can prevent the phenomenon.

Alternatively, the pitch of the grid of the cathode layer 12 and the light shield layer 16 of the lighting portion 200 (the pitch in the row and column directions) can be larger than the pitch of the pixels (the pitch in the row and column directions) and a ratio of the pitch of the grid to the pitch of the pixels (the pitch of the grid/the pitch of the pixels) can be a natural number. This setting can also prevent interference fringes or moiré fringes.

Figure 6:
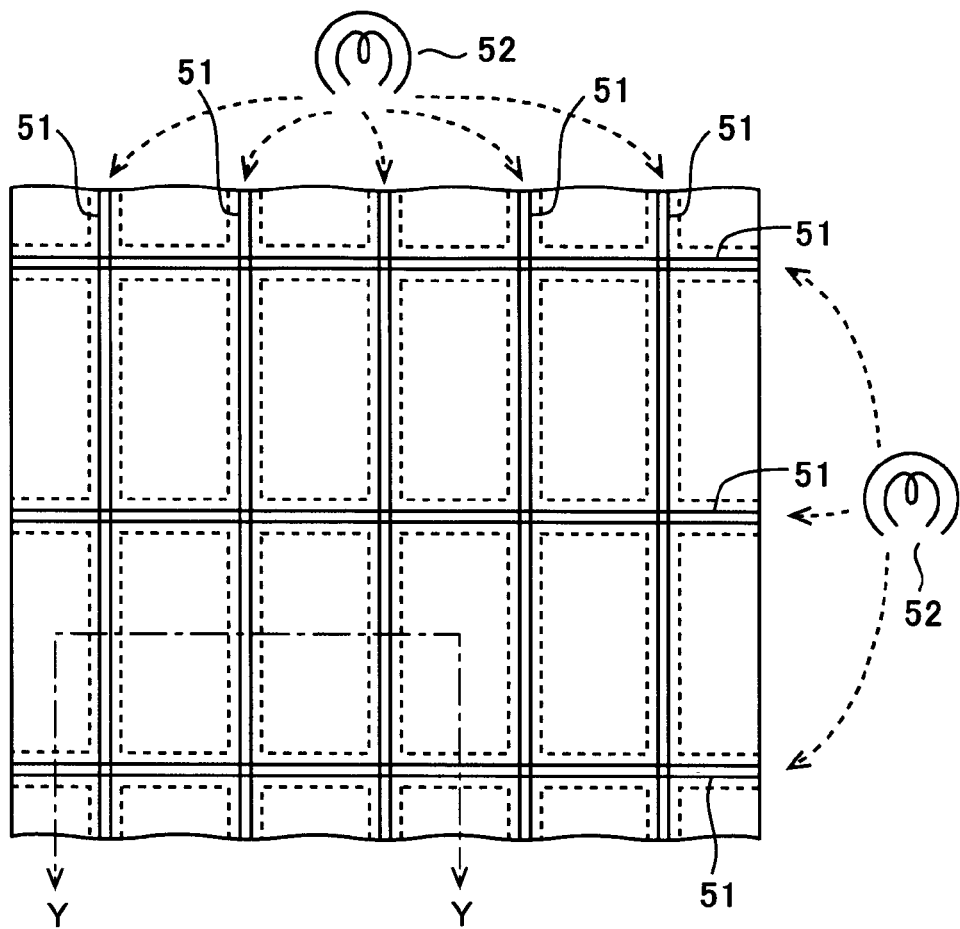
FIG. 6 is a plan view of a display device of a second embodiment of the invention on a lighting portion side.
Figure 7:
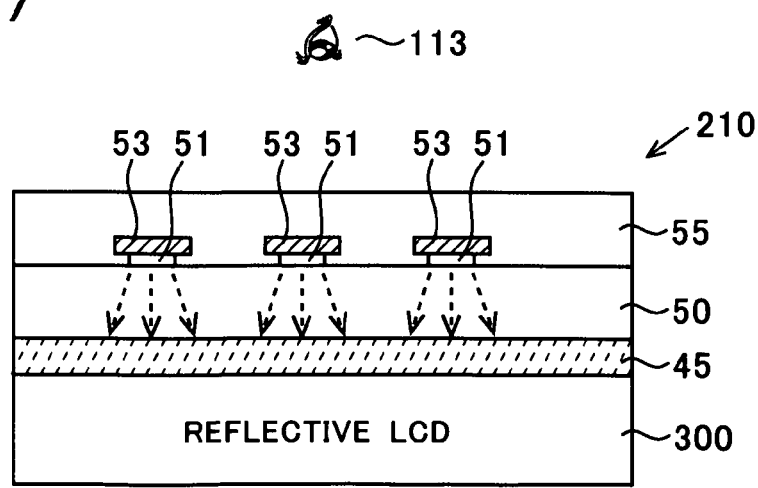
FIG. 7 is a cross-sectional view of the display device of the second embodiment of the invention.

Next, a display device of a second embodiment of the invention will be described referring to figures. FIG. 6 is a plan view of a reflective LCD 300 provided with a lighting portion 210 on the lighting portion 210 side, and FIG. 7 is a cross-sectional view of FIG. 6 along line Y-Y. In this embodiment, the lighting portion 210 is disposed above the reflective LCD 300, being opposed to a display surface of the LCD 300 as shown in FIG. 7. Descriptions on the reflective LCD 300 as an object to be lighted will be omitted since it is the same as that of the first embodiment.

This lighting portion 210 includes a light guide plate 51 formed on a transparent substrate 50 made of a glass substrate or the like and formed in a grid and a light source 52 supplying light to this light guide plate 51 instead of the organic EL element layer 15, differing from the first embodiment. The other structure is the same as that of the first embodiment.

The light guide plate 51 is a grid made of transparent resin and having a thickness of 1 μm. The light source 52 is disposed on the edges of the grid in the row and column directions, and light from the light source 52 is supplied from the edges into the light guide plate 51, and emitted out of the light guide plate 51. Thus, the light guide plate 51 serves as a light source having a grid shape. A light shield layer 53 is attached to the light guide plate 51 on the viewer 113 side. The light guide plate 51 attached with the light shield layer 53 can be further covered with a sheet of transparent substrate 55.

Light emitted downward from the light guide plate 51 is emitted to the reflective LCD 300 through the transparent substrate 50. Light emitted upward from the light guide plate 51 is reflected downward or absorbed by the light shield layer 53, and thus light from the light guide plate 51 is minimized from directly entering the eyes of the viewer 113 watching the lighting portion 210 from thereabove.

In the same manner as the first embodiment, the reflectance of incident light at an interface of two adjacent layers is set to 2% or less, or preferably 1% or less in order to prevent degradation of the contrast of a LCD display.

This means to satisfy the above-described formula 8 or preferably the formula 9 when the refractive indexes of the six layers, that is, the transparent substrate 50, the resin layer 45, the polarizing plate 37, the light scattering layer 36, the opposing substrate 34, and the common electrode 35 are defined as n(1), n(2), n(3), n(4), n(5), and n(6) respectively. In this case, k=1-5 in the formulae 8 and 9.

When there is an omitted layer in these six layers, the formula 8 or the formula 9 is to be satisfied between the remaining layers. For example, when the transparent substrate 50, the resin layer 45, and the light scattering layer 36 are omitted, the relation of the formula 8 or the formula 9 is to be satisfied between the remaining three layers, that is, the polarizing plate 37, the opposing substrate 34, and the common electrode 35.

Although the pixel electrode 33 is made of a reflective material such as aluminum (Al) in the above-described embodiment, the invention is not limited to this and can be made of a layered body of a transparent electrode made of, for example, ITO and a reflective film. Although the light shield layer 16 covering the cathode layer 12 is formed in the lighting portion 200 in this embodiment, the light shield layer 16 can be omitted. The cathode layer 12 functions as the light shield layer in this case although a slight amount of light leaks from the emissive region 13a to the viewer 113 side.

Figure 8:
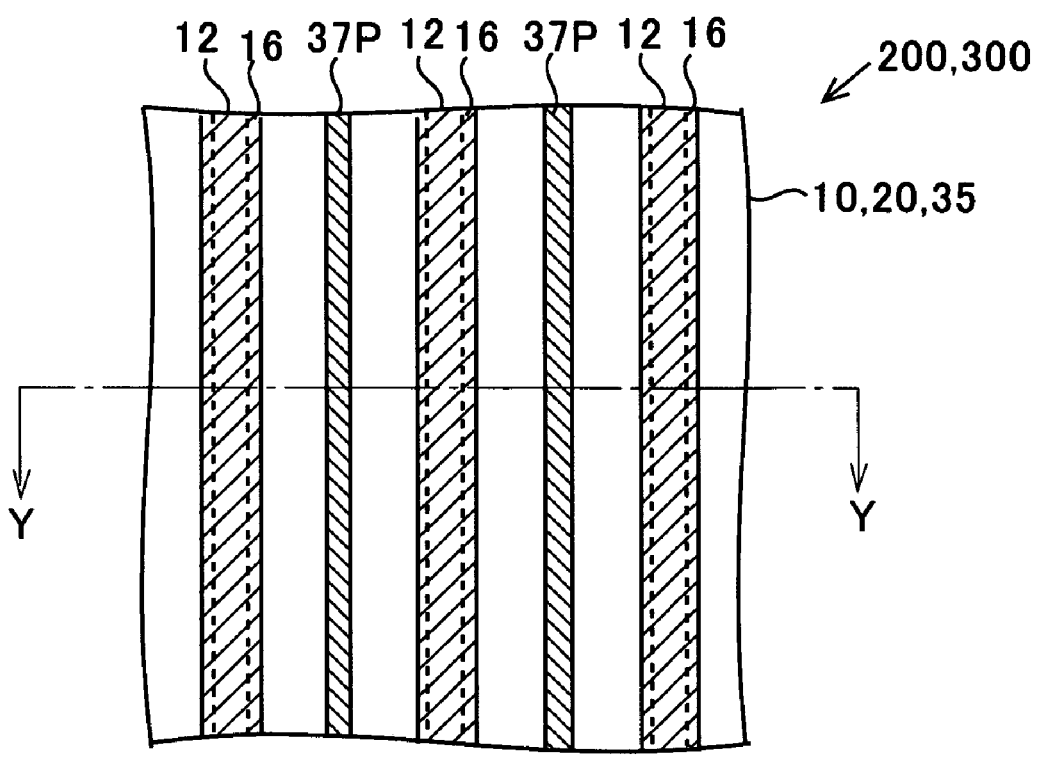
FIG. 8 is a plan view of a display device of a third embodiment of the invention on a lighting device side.
Figure 9:
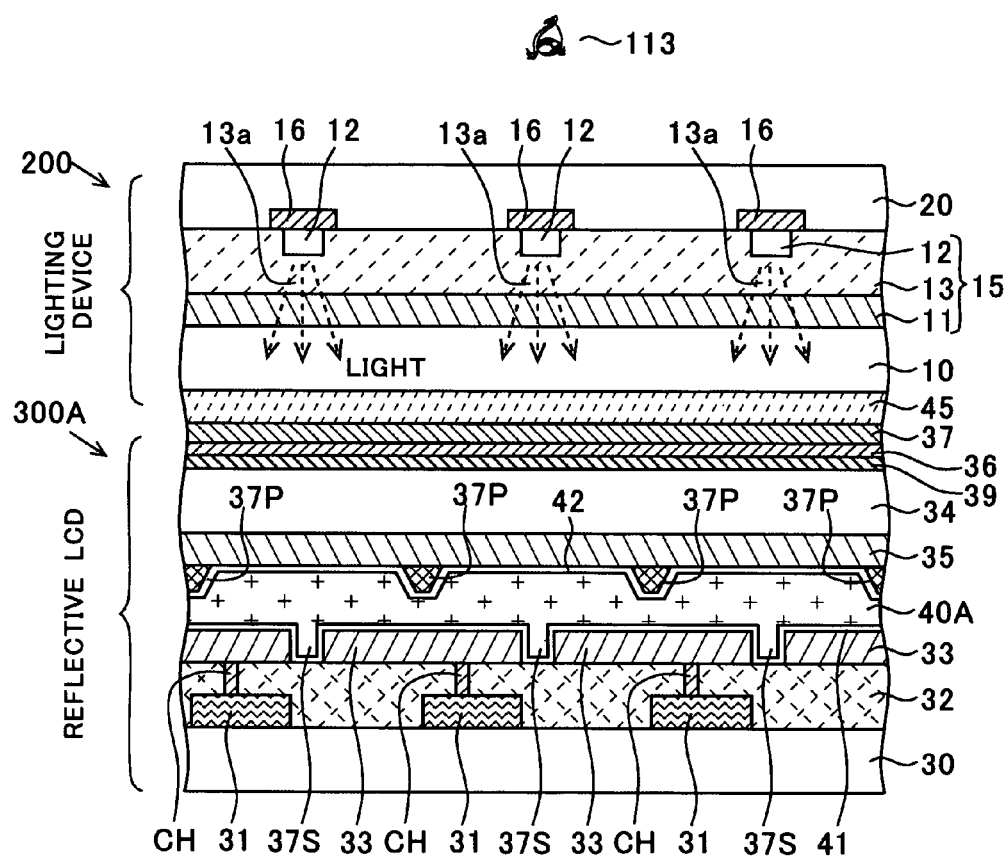
FIG. 9 is a cross-sectional view of the display device of the third embodiment of the invention.

Next, a display device of a third embodiment of the invention will be described referring to figures. FIG. 8 is a plan view of a reflective LCD 300A provided with a lighting portion 200 on the lighting portion 200 side, and FIG. 9 is a cross-sectional view of FIG. 8 along line Y-Y The reflective LCD 300A of this embodiment is a reflective LCD of a vertical alignment mode, and the reflectance of incident light at an interface of two adjacent layers is set to 2% or less or preferably 1% or less in order to minimize degradation of the contrast of a LCD display in the same manner as the first embodiment. Descriptions on the lighting portion 200 will be omitted since it is almost the same as that of the first embodiment.

The structure of the reflective LCD 300A will be described in different points from the structure of the reflective LCD 300 of the first embodiment. Separating regions SR, that is, slits 37S having a predetermined width are provided between the adjacent pixel electrodes 33. These slits 37S have a function as alignment control portions for multi-domain alignment of the liquid crystal layer 40 that will be described below. Furthermore, a vertical alignment film 41 for vertically aligning liquid crystal molecules relative to the TFT substrate 30 is formed so as to cover the pixel electrodes 33 and the slits 37S.

An opposing substrate 34 made of, for example, a glass substrate is disposed, being opposed to the TFT substrate 30 formed with the pixel electrodes 33. A common electrode 35 made of, for example, ITO is formed on the front surface of the opposing substrate 34. Projections 37P as alignment control portions for multi-domain alignment of liquid crystal molecules 40D of the liquid crystal layer 40A in predetermined two different directions, that will be described below, are formed on the common electrode 35. The projections 37P are formed by patterning a resist material for example. A vertical alignment film 42 is further formed covering the common electrode 35 and the projections 37P.

A λ/4 wavelength plate 39 (a quarter wavelength plate) for causing optical retardation of a quarter of a wavelength λ of light is disposed on the back surface of the opposing substrate 34. The λ/4 wavelength plate 39 changes linearly polarized light to circularly polarized light, or changes circularly polarized light to linearly polarized light. It is possible to further laminate a λ/2 wavelength plate (a half wavelength plate) (not shown) causing optical retardation of a half of a wavelength λ of light on this λ/4 wavelength plate 39 for the polarization change of broadband light. A light scattering layer 36 made of, for example, a diffusion adhesion layer and a polarizing plate 37 are further laminated on the λ/4 wavelength plate 39 in this order. The light scattering layer 36 is provided for scattering light emitted from the lighting portion 200 so as to equally irradiate the pixel electrode 33 with the light.

A liquid crystal layer 40A is sealed between the TFT substrate 30 and the opposing substrate 34. The liquid crystal layer 40A is made of, for example, liquid crystal molecules 40D (e.g. a nematic liquid crystal) having negative dielectric anisotropy and vertically aligned. That is, this reflective LCD 300A operates in a vertical alignment mode, that is, a VA mode.

In this embodiment, when the refractive indexes of the nine layers, that is, the anode layer 11, the transparent substrate 10, the resin layer 45, the polarizing plate 37, the light scattering layer 36, the λ/4 wavelength plate 39, the opposing substrate 34, the common electrode 35, and the vertical alignment film 42 are defined as n(1), n(2), n(3), n(4), n(5), n(6), n(7), n(8), and n(9) respectively, the relation of the formula 8 need be satisfied in order to set the reflectance at each of the interfaces of these layers to 2% or less. Furthermore, the relation of formula 9 need be satisfied in order to set the reflectance at each of the interfaces of these layers to 1% or less. It is noted that k=1-8 in the formulae 8 and 9.

The connection and the positional relationship between the lighting portion 200 and the reflective LCD 300A are the same as those of the first embodiment.

Figure 10A:
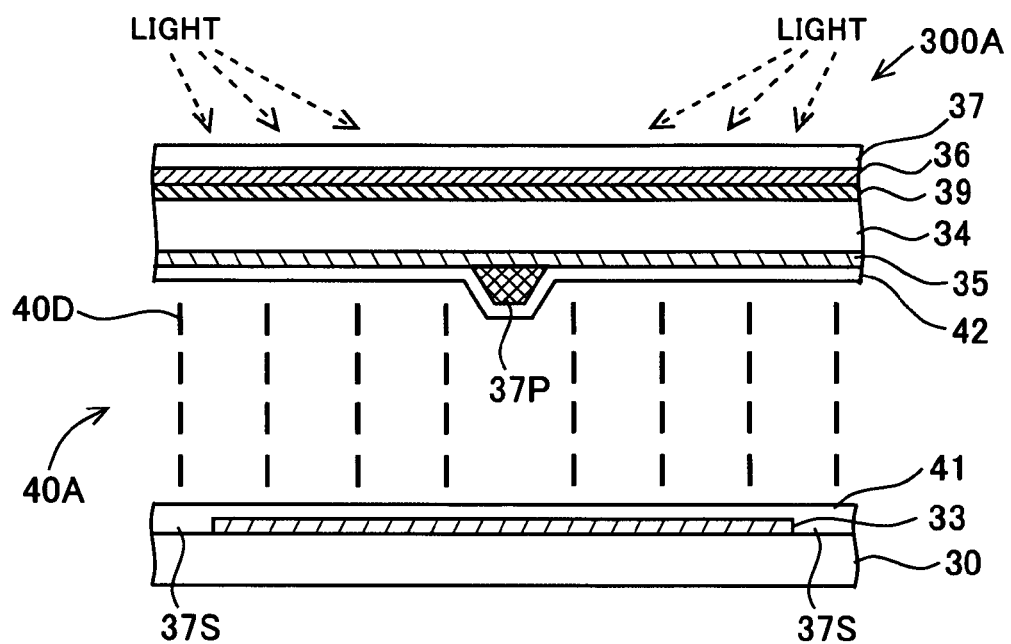
FIGS. 10A and 10B are cross-sectional views for explaining the operation of the display device of the third embodiment of the invention.
Figure 10B:
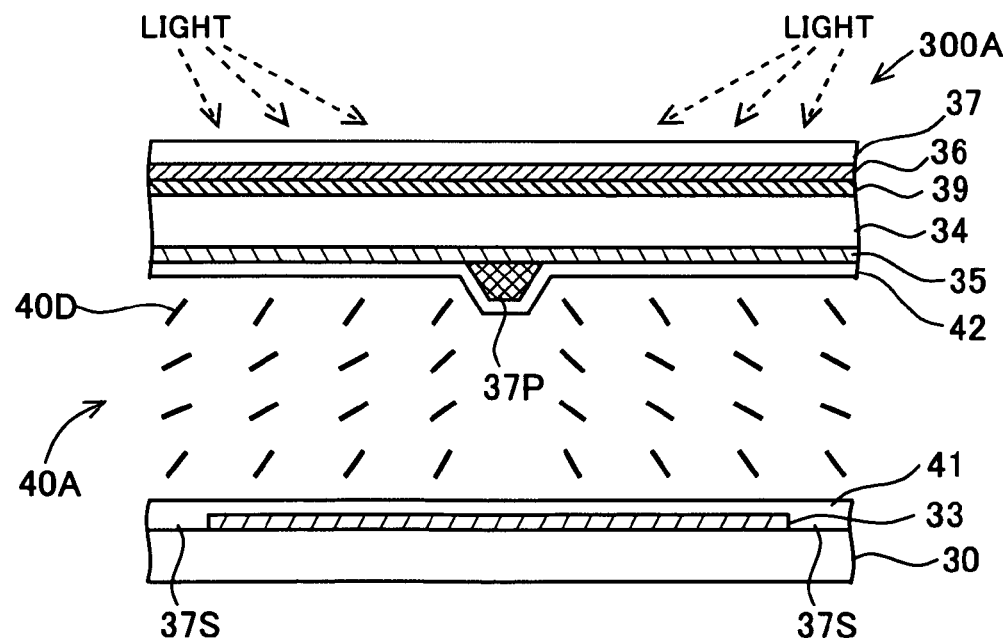

Next, the operation of the described reflective LCD 300A will be described referring to figures. FIGS. 10A and 10B are cross-sectional views explaining the operation of the display device of this embodiment of the invention, that show the reflective LCD 300A only. It is noted that the TFT 31 and the interlayer insulation film 32 in the reflective LCD 300A are not shown in FIGS. 10A and 10B. FIG. 10A shows a state where an electric field is not generated in the liquid crystal layer 40A, and FIG. 10B shows a state where an electric field is generated in the liquid crystal layer 40A.

As shown in FIG. 10A, when a voltage is not applied to the pixel electrode 33 and the common electrode 35 and an electric field is not generated in the liquid crystal layer 40A, the liquid crystal molecules 40D keeps an initial alignment state, that is, a vertical alignment state by the vertical alignment films 41 and 42. When unpolarized light is emitted from the lighting portion 200 to the reflective LCD 300A, the light enters the polarizing plate 37 and is changed to linearly polarized light corresponding to its polarization axis. This linearly polarized light is scattered by the light scattering layer 36 in such directions as to equally irradiate the pixel electrode 33 with light. This linearly polarized light enters the λ/4 wavelength plate 39 and is changed to circularly polarized light by its optical retardation, and enters the liquid crystal layer 40A through the opposing substrate 34 and the common electrode 35.

At this time, since the liquid crystal molecules 40D of the liquid crystal layer 40A are vertically aligned, the incident circularly polarized light passes through the liquid crystal layer 40A without being changed in its optical retardation and reaches the pixel electrode 33. The circularly polarized light reaching the pixel electrode 33 is reflected toward the common electrode 35 and changed in its rotatory direction by the pixel electrode 33. The circularly polarized light of which the rotatory direction is changed passes through the liquid crystal layer 40A without being changed in its optical retardation, and enters the λ/4 wavelength plate 39 through the common electrode 35 and the opposing substrate 34. This circularly polarized light is changed back to linearly polarized light by the optical retardation of the λ/4 wavelength plate 39.

At this time, the linearly polarized light emitted out from this λ/4 wavelength plate 39 has a polarization axis perpendicular to the polarization axis of the first linearly polarized light by the polarizing plate 37, corresponding to the rotatory direction of the circularly polarized light changed when entering. That is, since the polarization axis of this linearly polarized light does not correspond to the polarization axis of the polarizing plate 37 and is perpendicular thereto, the light does not pass through the polarizing plate 37 and provides a black display.

On the other hand, when a voltage is applied to the pixel electrode 33 and the common electrode 35 and an electric field is generated in the liquid crystal layer 40A as shown in FIG. 10B, the liquid crystal molecules 40D are aligned in such a direction as to lie nearly perpendicular to the direction of the electric field, that is, nearly horizontally relative to the TFT substrate 30 and the opposing substrate 34 by its negative dielectric anisotropy. This alignment state is not completely horizontal, and has predetermined optical retardation that changes circularly polarized light entering the liquid crystal layer 40A to linearly polarized light.

When unpolarized light is emitted from the lighting portion 200 to the reflective LCD 300A, the light enters the polarizing plate 37, is changed to linearly polarized light corresponding to its polarization axis, is changed to circularly polarized light by passing through the λ/4 wavelength plate 39, and enters the liquid crystal layer 40A. This circularly polarized light is changed back to linearly polarized light by the predetermined optical retardation of the liquid crystal layer 40A, and reaches the pixel electrode 33. Then, the linearly polarized light reflected by the pixel electrode 33 is changed to circularly polarized light again by the predetermined optical retardation of the liquid crystal layer 40A, and emitted out from the liquid crystal layer 40A. This circularly polarized light enters the λ/4 wavelength plated 39 and is changed to linearly polarized light. At this time, the circularly polarized light entering the λ/4 wavelength plate 39 has the same rotatory direction as the direction when entering the liquid crystal layer 40A. Therefore, the linearly polarized light emitted out from the λ/4 wavelength plate 39 has the polarization axis of the same angle as the polarization axis of the linearly polarized light that first passes through the polarizing plate 37. Therefore, this linearly polarized light passes through the polarizing plate 37 and is emitted out on the viewer 113 side, and provides a white display.

In the display, the slits 37S between the plurality of pixel electrodes 33 and the projections 37P of the common electrode 35 provided as the alignment control portions can realize the wider view angle of the reflective LCD 300A when a voltage is applied thereto.

Furthermore, since the liquid crystal layer 40A operates in the vertical alignment mode, even if most light from the lighting portion 200 obliquely enters the display surface of the liquid crystal layer 40A, degradation of optical characteristics such as contrast, that is caused by an angle of incident light, can be minimized compared with the other modes.

Figure 11:
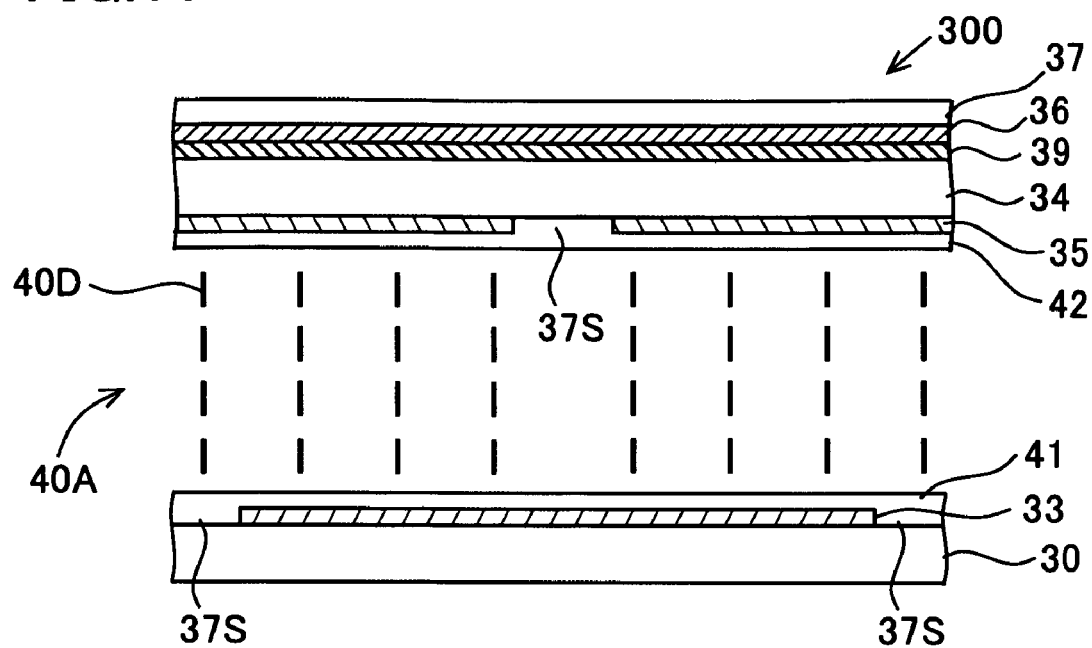
FIG. 11 is a cross-sectional view of the display device of the third embodiment of the invention.

Although the projections 37P as the alignment control portions are provided on the common electrode 35 in the reflective LCD 300 of the described embodiment, the invention is not limited to this. For example, slits 37S can be provided on the common electrode 35 instead of the projections 37P, as shown in FIG. 11.

Next, a display device of a fourth embodiment of the invention will be described referring to figures.

This embodiment describes a modification of the structure of the lighting portion 200 of the first and third embodiments. There is no modification to the structure of the reflective LCDs 300 and 300A.

Figure 12:
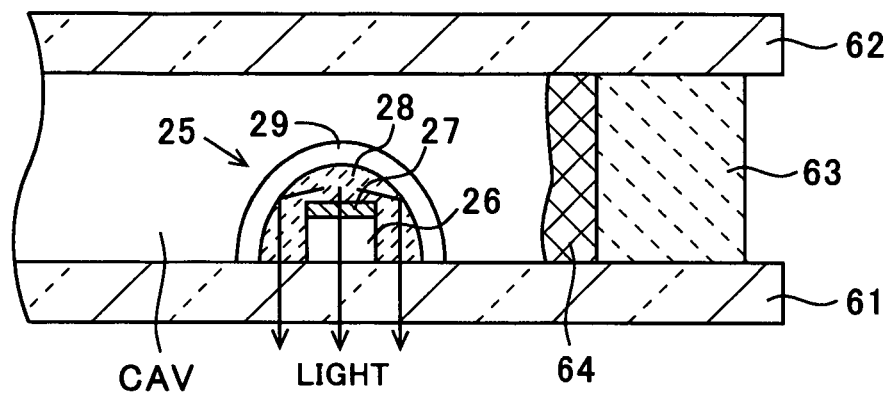
FIG. 12 is a cross-sectional view of a lighting portion of a display device of a fourth embodiment of the invention.
Figure 13:
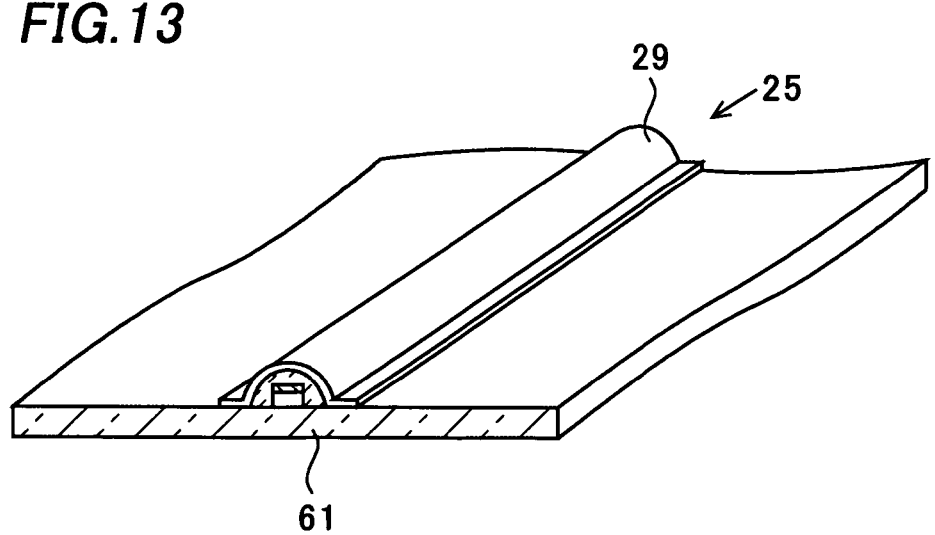
FIG. 13 is a perspective view of the lighting portion of the display device of the fourth embodiment of the invention.
Figure 14:
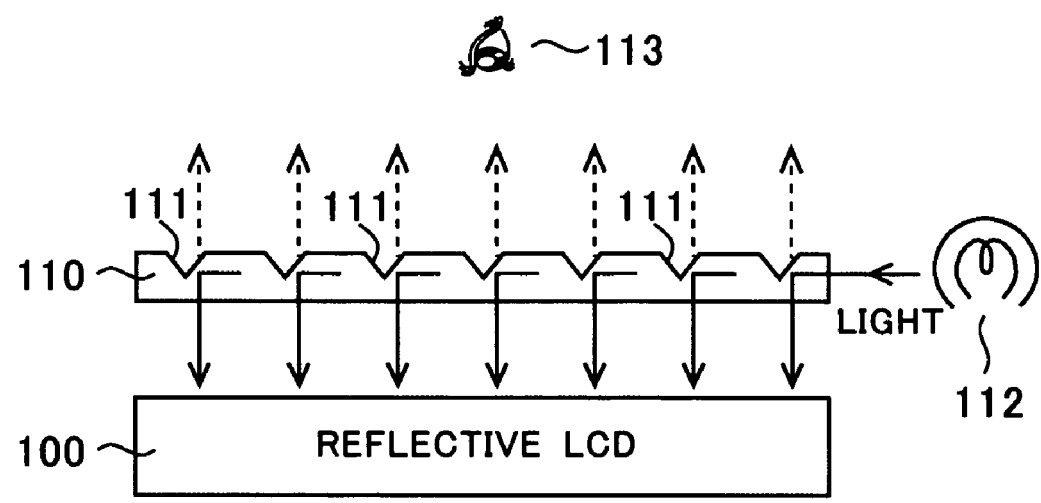
FIG. 14 is a cross-sectional view of a reflective LCD provided with a lighting portion of a conventional art.

FIG. 12 is a cross-sectional view of a lighting portion 200A. FIG. 13 is a schematic perspective view of the lighting portion 200A. FIGS. 12 and 13 show one of a plurality of organic EL elements 25 in the organic EL element layer 15.

A step forming layer 26 is formed on a first transparent substrate 61 (corresponds to the transparent substrate 10 of the first embodiment) in a region for forming the organic EL element 25 as shown in FIG. 12. This step forming layer 26 is made of transparent resin such as photosensitive acrylic resin. An anode 27 made of a transparent conductive material such as ITO (Indium Tin Oxide) or IZO (Indium Zinc Oxide) is formed on the step forming layer 26.

An organic layer 28 having an arch-shaped surface is formed, covering the top surface of the anode 27 and the side surface of the step forming layer 26 and the anode 27. The organic layer 28 includes a hole transport layer 13H, an emissive layer 13L, and an electron transport layer 13E that are formed on the anode 27 in this order. The organic layer 28 can form the arch shape, for example, by forming the hole transport layer 13H thicker than the emissive layer 13L and the electron transport layer 13E. Furthermore, a cathode 29 made of metal such as aluminum or chromium is formed, covering the organic layer 28.

This organic EL element 25 is sealed in a space CAV between the first transparent substrate 61 and the second transparent substrate 62 (corresponding to the transparent substrate 20 of the first embodiment) with a sealing member 63 such as UV curable resin therebetween. Furthermore, a desiccant 64 is disposed in the space CAV on the sealing member 63 side. Alternatively, it is possible to mix desiccant particles in the sealing member 63. It is preferable to seal a dry nitrogen gas in this space CAV. This structure can prevent deterioration of the organic layer 28 due to moisture.

Alternatively, it is possible to fill the space CAV with resin although not shown. In this case, light reflection by an interface between the first transparent substrate 61 or the second transparent substrate 62 and the resin can be minimized by using filling resin having a refractive index near a refractive index of glass. It is also possible that acrylic resin mixed with a desiccant or the like is provided around the organic EL element 25 in the space CAV, for example.

Furthermore, although the organic EL element 25 is formed in a half cylinder shape, for example, as shown in FIG. 13, it is preferable that both ends of the cathode 29 have portions directly formed on the first transparent substrate 61 in this case. With this structure, the organic layer 28 can be certainly covered with the cathode 29, and moisture can be certainly prevented from infiltrating into the organic layer 28.

In the organic EL element 25, since the step forming layer 26 and the anode 27 are transparent, light emitted downward from the organic layer 28 on the anode 27 goes toward the reflective LCD 300 or 300A. On the other hand, light emitted in the other directions from the organic layer 28 is reflected by the cathode 29 functioning as a reflection film, being focused on the reflective LCD 300 or 300A. That is, the directivity of light emitted by the organic EL element 25 is controlled so that the light goes in a vertical direction or almost vertical direction to the reflective LCD 300 or 300A. This reduces light entering the reflective LCD 300 or 300A obliquely relative to its display surface, and thus reduces light emitted out from the reflective LCD 300 or 300A obliquely relative to its display surface. Therefore, the contrast of a display is enhanced, and thus a display quality can be enhanced.

Furthermore, since the step forming layer 26 is inserted between the anode 27 and the first transparent substrate 61 in the lighting portion 200A of this embodiment, the relation of the formula 8 need be satisfied in order to set the reflectance at each of the interfaces to 2% or less, and the relation of the formula 9 need be satisfied in order to set the reflectance to 1% or less.

Furthermore, in the first, third, and fourth embodiments, the organic layers 13 or 28 can emit a different color of light by using different chemical materials in a dopant for the emissive layer 13L. In these embodiments, for example, the organic layer 13 or 28 emits light of any one color of R (red), G (green), and B (blue), and a set of the organic layers 13 or 28 of the above three colors emits white light. However, wavelengths of R, G, and B colors are not particularly limited, and the wavelengths can lie in a certain range using a specified wavelength as a reference. That is, the wavelengths of R, G, and B can differ from the generally used wavelengths of R, G, and B.

What is claimed is:

1. A display device comprising:
   a lighting device comprising a first substrate and a patterned light emitting element disposed on a surface of the first substrate and comprising a patterned electrode;
   a liquid crystal display device attached to the first substrate of the lighting device and comprising a second substrate, a plurality of reflective electrodes disposed on the second substrate, a liquid crystal layer disposed on the reflective electrodes, a common electrode disposed on the liquid crystal layer, and a third substrate disposed on the common electrode layer; and
   a polarizing plate and a light scattering layer that are disposed between the first and third substrates so that the first substrate, the polarizing plate, the light scattering layer and the third substrate are stacked in this order,
   wherein a first transparent layer is disposed between the surface of the first substrate on which the patterned light emitting element is disposed and the liquid crystal layer and has a first refractive index,
   a second transparent layer is disposed between the surface of the first substrate on which the patterned light emitting element is disposed and the liquid crystal layer, has a second refractive index and is in contact with the first transparent layer, and a ratio of the first and second refractive indices is between 1.22 and 0.82,
   the first transparent layer and the second transparent layer are stacked in a direction of the stacking of the first substrate, the polarizing plate, the light scattering layer and the third substrate and not stacked in a direction perpendicular to the direction of the stacking of the first substrate, the polarizing plate, the light scattering layer and the third substrate,
   the light scattering layer is in direct physical contact with the polarizing plate and the third substrate,
   the lighting device further comprises a light shield layer that covers and is wider than the patterned electrode, and
   a distance (L1) between a lateral edge of the patterned electrode and a lateral edge of the light shield layer extending beyond the lateral edge of the patterned electrode and a thickness (L2) that is a sum of a thickness of the patterned electrode and a thickness of an organic electroluminescent layer disposed under the patterned electrode satisfy the following relationship: $L1 \geq L2$.

2. The display device of claim 1, wherein the first transparent layer is the light scattering layer, the polarizing plate or a resin layer disposed between the polarizing plate and the first substrate.

3. The display device of claim 1, wherein the patterned electrode is disposed further from the first substrate than another electrode of the patterned light emitting element.

4. The display device of claim 3, wherein the organic electroluminescent layer comprises an electron transport layer, an emissive layer, and a hole transport layer that are disposed between the patterned electrode and the the another electrode.

5. The display device of claim 4, wherein the patterned light emitting element is formed as stripes.

6. The display device of claim 3, wherein the patterned light emitting element is formed as stripes.

7. The display device of claim 1, wherein the patterned light emitting element is formed as stripes.

8. The display device of claim 1, wherein the patterned light emitting element emits light having a peak at a specific wavelength.

9. The display device of claim 8, wherein the specified wavelength corresponds to a red color, a green color or a blue color.

10. The display device of claim 1, wherein the first transparent layer is the first substrate, the third substrate or the common electrode.

11. The display device of claim 1, wherein the light scattering layer comprises a diffusion adhesion layer.

* * * * *